Patented Jan. 18, 1949

2,459,408

UNITED STATES PATENT OFFICE 2,459,408

METHOD OF PROLONGING THE USEFUL LIFE OF AQUEOUS ALUMINUM-CASEIN COATING COMPOSITION

John Alfred Bicknell, Westbrook, Maine, assignor to S. D. Warren Company, Boston, Mass., a corporation of Massachusetts No Drawing. Application January 14, 1946, Serial No. 641,172

9 Claims. (Cl. 106—146)

This invention relates to the paper coating art, and is particularly concerned with an improved mode of preparing an aqueous casein-aluminum coating composition for use in making an aluminum coated paper whereby to prolong the useful life of the coating composition.

As in the case of any other aqueous paper coating composition comprising casein as the adhesive component, the casein must be "solubilized" by some treatment—usually treatment with a caustic alkali such as caustic soda—effective to bring the casein into solution in the water to form the liquid component of the aluminum coating mixture.

In the preparation of such a coating composition, experience has established that in order to produce a smooth aluminum coating, free from lumps and graininess and "curdled" appearance, it is necessary that some dispersing agent, e. g., a soluble polyphosphate such as sodium pyrophosphate, be present. Since the dispersing agent just named has an alkaline reaction, I attempted to solubilize the casein component for the aqueous aluminum powder-containing coating composition by admixing with the casein enough of the sodium pyrophosphate (not less than 12 parts by weight of the latter to 100 parts of the casein) to bring the casein into solution in the alloted amount of water for the mixture.

When casein is thus solubilized in water by the use of 12 parts per hundred of sodium pyrophosphate and the coating mixture is prepared therefrom by thoroughly admixing the allotted amount of finely divided aluminum therewith, the resulting coating mixture as freshly prepared shows good dispersion of the aluminum, the pH of the mixture is about neutral, that is, about 7.0, and coatings made therefrom are excellent. However, if the coating mixture is allowed to age for a matter of a few (e. g., 5 or 6) hours, only, before it is applied to paper, the pH increases very appreciably, and the mixture assumes a "curled" texture and appearance; the aluminum reacts with a component of the mixture, large amounts of hydrogen are evolved, and an aluminate apparently forms. Consequently, the mixture is useful for a few hours, only, after it has been prepared and thereafter is worthless.

I discovered that if the casein is admixed with the allotted amount of water and a relatively small amount of sodium pyrophosphate—i. e., an amount clearly insufficient in itself to effect the solubilization of the casein, e. g., not more than one-half the amount which is necessary by itself to solubilize the casein—and a mild (non-caustic) solvent for casein, in amount sufficient to complete the solubilization of the casein but not sufficient to raise the pH of the solution appreciably above 7.0, the resulting aluminium powder-containing coating composition made therefrom not only has the desired properties of smoothness, freedom from curdling, etc., as freshly prepared, but also may be aged for up to 48 hours without marked increase in the pH or curdling or much evolution of hydrogen.

The following specific example, in which "parts" are given as parts by weight, is illustrative but not limitative of the invention.

100 parts of casein, 50 parts of urea and 5 parts of sodium pyrophosphate, were added to and stirred in enough water to yield a 10% casein solution. Maintaining the water at 100° to 125° F. materially expedited the dissolution of the casein but was not absolutely necessary. The casein completely dissolved.

100 parts of finely divided aluminium flake were prepared for incorporation into the composition in known manner, by being wetted with a small amount, i. e., from 5 to 20 parts, of butanol or other wetting agent suitable for wetting the surfaces of the aluminum flakes and making the flake wet readily in the casein solution. The wetted aluminum flake was added to and thoroughly stirred in an amount of the above described casein solution equivalent to 25 parts, dry weight, of casein. Dilution water was added to reduce the total solids to about 22%.

The resulting dispersion was excellent. The composition as freshly prepared had a pH of about 7. Coatings on paper, made with the freshly prepared composition, were desirably even and otherwise completely satisfactory. A portion of the composition allowed to age for slightly below 6 hours was tested (by coating on paper) and found not to have depreciated in value. Other portions were aged for longer period, up to a maximum of 48 hours, and found to have retained substantially all their original coating value. What evolution of hydrogen occurred was very minor (as contrasted with the hydrogen evolution resulting when 12 parts, per hundred, of sodium pyrophosphate were employed), and the aged mixture showed no substantial curdling and only an inconsequentially small rise in alkalinity.

A direct comparison was made of the aging qualities in respect to pH of two aqueous aluminum coating compositions similar to the foregoing and exactly alike except that the first contained casein dissolved by 12% of sodium pyrophosphate while the second contained casein dissolved by 5% of sodium pyrophosphate and 50% urea. When first prepared each had a pH value slightly below 7.0. After standing for 24 hours the first mixture (all pyro solvent) had a pH value of about 8.7 while the second (urea and pyro solvent) had a pH value of about 7.3.

The urea of the foregoing example may be replaced partly or wholly by an equivalent amount of a substituted urea compound which reacts alkaline in aqueous solution. Thus, by experiment I have established that for the urea of the foregoing example there may be substituted an equivalent amount of thiourea. The expression "mild alkali" is intended to comprise both urea per se and thiourea and other substituted urea compounds exerting alkaline reaction in aqueous solution.

It is to be understood that the soluble polyphosphate dispersing agent, desirable for producing smooth dispersions of the finely divided metal particles in the coating compositions, may be an alkaline hexametaphosphate or tetraphosphate—for providing the polyphosphate ion which is the actual dispersing agent. If one of the latter is employed, it may be expedient to use also a small amount of a stronger alkali, e. g., ammonia, caustic alkali, borax or the like, to supplement the solubilizing effect of the alkaline polyphosphate, the amount of such supplemental alkali used being always, of course, insufficient for complete solubilizing of the casein. I prefer to use the pyrophosphate, both because of its present lower cost and because it is sufficiently alkaline to function as casein solvent simultaneously with exerting the dispersing effect afforded by the polyphosphate ion.

I claim:

1. Method of preparing an aqueous solution of casein for use as the liquid component of a paper coating composition containing finely divided aluminum as pigmentary component, which consists in solubilizing the casein by means of sodium pyrophosphate and a solvent for casein of the group consisting of urea and substituted urea compounds exerting alkaline reaction in aqueous solution, the amount of sodium pyrophosphate used being insufficient by itself to solubilize the casein.

2. The method of preparing the aqueous paper coating composition comprising casein and finely divided aluminum, which comprises dissolving casein in water with the aid of sodium pyrophosphate and a solvent for casein of the group consisting of urea and substituted urea compounds exerting alkaline reaction in aqueous solution, the sodium pyrophosphate being used in an amount insufficient by itself to solubilize the casein and incorporating the finely divided aluminum uniformly through the resulting casein solution.

3. Method of preparing an aqueous solution of casein for use as the liquid component of a paper coating composition containing finely divided aluminum as pigmentary component, which consists in solubilizing the casein by means of sodium pyrophosphate and a solvent for casein of the group consisting of urea and substituted urea compounds exerting alkaline reaction in aqueous solution, the amount of sodium pyrophosphate used being not more than half that amount which is necessary by itself to solubilize the casein.

4. Method of preparing an aqueous solution of casein for use as the liquid component of a paper coating composition containing finely divided aluminum as pigmentary component, which consists in solubilizing the casein by means of sodium pyrophosphate and urea, the amount of sodium pyrophosphate used being insufficient by itself to solubilize the casein.

5. Method of preparing an aqueous solution of casein for use as the liquid component of a paper coating composition containing finely divided aluminium as pigmentary component, which consists in solubilizing the casein by means of about 50 parts of urea and about 5 parts of sodium pyrophosphate based on 100 parts of the casein.

6. An aqueous paper coating composition whose solids content consists essentially of finely divided aluminum, casein, sodiun pyrophosphate in a substantial amount less than 12 parts by weight thereof per each 100 parts of weight of the casein, and urea in an amount at least sufficient to complete solution of the casein.

6. An aqueous paper coating composition whose solids content consists essentially of finely divided aluminum, casein, sodium pyrophosphate in a substantial amount less than 12 parts by weight thereof per each 100 parts by weight of the casein, and urea in an amount at least sufficient to complete solution of the casein.

7. Paper coated with a composition whose solids content consists essentially of finely divided aluminum, casein, sodium pyrophosphate in a substantial amount less than 12 parts by weight thereof per each 100 parts by weight of the casein, and urea in an amount at least sufficient to complete solution of the casein.

8. An aqueous paper coating composition whose solids content consists essentially of finely divided aluminum, casein, about 5 parts by weight of sodium pyrophosphate per each 100 parts by weight of casein, and urea in an amount at least sufficient to complete solution of the casein.

9. Paper coated with a composition whose solids content consists essentially of finely divided aluminum, casein, about 5 parts by weight of sodium pyrophosphate per each 100 parts by weight of casein, and urea in an amount at least sufficient to complete solution of the casein.

JOHN ALFRED BICKNELL.

REFERENCES CITED

The following references are of record in the file of this patent:

UNITED STATES PATENTS

| Number | Name | Date |
| --- | --- | --- |
| 1,886,750 | Shisler | Nov. 8, 1932 |
| 2,064,387 | Schwartz | Dec. 15, 1936 |
| 2,293,385 | Dunham | Aug. 18, 1942 |
| 2,362,884 | Clark | Nov. 14, 1944 |

Certificate of Correction

Patent No. 2,459,408.  January 18, 1949.

JOHN ALFRED BICKNELL

It is hereby certified that errors appear in the printed specification of the above numbered patent requiring correction as follows:

Column 3, line 51, for the word "the" after "preparing" read *an*; column 4, line 26, for "parts of" read *parts by*; line 29, beginning with "6. An aqueous" strike out all to and including the words and period "the casein." in line 35;

and that the said Letters Patent should be read with these corrections therein that the same may conform to the record of the case in the Patent Office.

Signed and sealed this 26th day of April, A. D. 1949.

[SEAL]

THOMAS F. MURPHY,
*Assistant Commissioner of Patents.*